(12) United States Patent
Kagawa et al.

(10) Patent No.: US 7,706,035 B2
(45) Date of Patent: Apr. 27, 2010

(54) IMAGE PROCESSING APPARATUS AND IMAGE PROCESSING METHOD

(75) Inventors: Shuichi Kagawa, Tokyo (JP); Jun Someya, Tokyo (JP); Hiroaki Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 265 days.

(21) Appl. No.: 11/907,920

(22) Filed: Oct. 18, 2007

(65) Prior Publication Data

US 2008/0094672 A1 Apr. 24, 2008

(30) Foreign Application Priority Data

Oct. 20, 2006 (JP) .............................. 2006-286220

(51) Int. Cl.
*G03F 3/08* (2006.01)
*G06F 15/00* (2006.01)
*H04N 1/46* (2006.01)
*G06K 9/00* (2006.01)

(52) U.S. Cl. ........................ 358/520; 358/1.9; 358/515; 358/518; 382/162; 382/167

(58) Field of Classification Search ................. 358/520, 358/1.9, 515, 518; 382/162, 167; 348/222.1
See application file for complete search history.

(56) References Cited

U.S. PATENT DOCUMENTS 7,119,927 B2 * 10/2006 Sugiura et al. ............... 358/1.9
2007/0008556 A1 1/2007 Kagawa et al.

FOREIGN PATENT DOCUMENTS

JP 2002-041025 B2 2/2002
JP 2005-78242 A 3/2005

* cited by examiner

*Primary Examiner*—Charlotte M Baker
(74) *Attorney, Agent, or Firm*—Birch, Stewart, Kolasch & Birch, LLP

(57) ABSTRACT

An image processing apparatus processes an input color image, combines the input color image with the processed color image in a ratio that varies from picture element to picture element according to the hue of the picture element, and outputs the combined image. The output image can accordingly be selectively processed to give desired qualities in suitable degrees to particular hues.

17 Claims, 8 Drawing Sheets

IMAGE PROCESSING APPARATUS AND IMAGE PROCESSING METHOD

BACKGROUND OF THE INVENTION

1. Field of the Invention

This invention relates to image data processing in apparatus involved in full-color printing, such as a printer, video printer, or scanner, or in display apparatus such as a monitor, and more particularly to an image processing apparatus and method that process image data represented by data for a plurality of colors according to the requirements of a particular device or particular usage conditions.

2. Description of the Related Art

Japanese Patent Application Publication No. 2002-41025 describes a conventional image processing apparatus and method that provides means of selectively smoothing input image data, means of discriminating between light parts and dark parts of the input image data and selecting the smoothing process that is carried out on light parts adjacent to dark parts, and means of displaying the selectively smoothed image data.

When image data represented by data for a plurality of colors are input and output or displayed, image processing is carried out for a variety of purposes. Specific examples of such image processing include modifying the spatial or temporal frequency characteristics of the image data and changing the contrast of the image data. With conventional apparatus and methods, these processes are carried out uniformly on the color data of all hues, without making use of hue information. A consequent problem is that it has not been possible to confine the image processing to specific hues, or to perform image processing with different processing characteristics on different hues.

SUMMARY OF THE INVENTION

The invention provides an image processing apparatus for processing first image data including first color data expressing values of picture elements for a plurality of colors to obtain second image data including second color data expressing values of the picture elements for the plurality of colors. The image processing apparatus includes:

an image processing unit that processes the first image data to obtain third image data;

a hue region data calculator that uses the first image data to calculate hue region data valid for a particular hue component among a plurality of hues;

a data combining coefficient calculator that calculates a data combining coefficient from the hue region data; and an image data combiner that combines the first image data and the third image data according to the combining coefficient to obtain the second image data.

The invention enables the size of the effect of image processing to be controlled on the basis of hue.

DETAILED DESCRIPTION OF THE INVENTION

Figure 1:
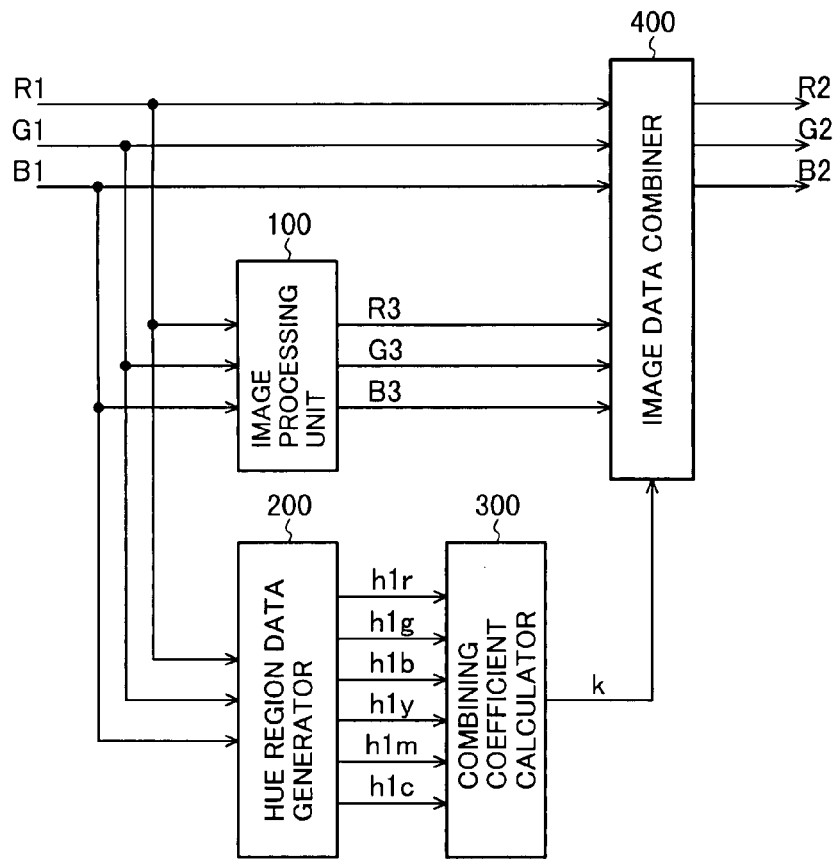
FIG. 1 is a block diagram illustrating an image display apparatus according to a first embodiment of the invention.

Embodiments of the invention will now be described with reference to the attached drawings, in which like elements are indicated by like reference characters.

First Embodiment

Referring to FIG. 1, the image processing apparatus in the first embodiment comprises an image processing unit 100, a hue region data generator 200, a combining coefficient calculator 300, and an image data combiner 400.

First image data R1, G1, B1 are input to the image processing unit 100, the hue region data generator 200, and the image data combiner 400. The first image data R1, G1, and B1 are color data representing a red, green, and blue value for each picture element or pixel. The image processing unit 100 processes the first image data R1, G1, B1 to obtain third image data R3, G3, B3, and outputs the third image data R3, G3, B3 to the image data combiner 400.

Examples of image processing carried out in the image processing unit 100 include modifying the spatial or temporal frequency characteristics of the image data in order to remove noise components or smooth the image data. Other examples include changing the contrast of the image data, and converting the gray scale.

The hue region data generator 200 uses the first image data R1, G1, B1 to calculate hue region data h1$r$, h1$g$, h1$b$, h1$c$, h1$m$, and h1$y$, each valid (capable of taking a value other than zero) in a particular one of six overlapping hue regions: red, green, blue, cyan, magenta, and yellow.

Figure 2:
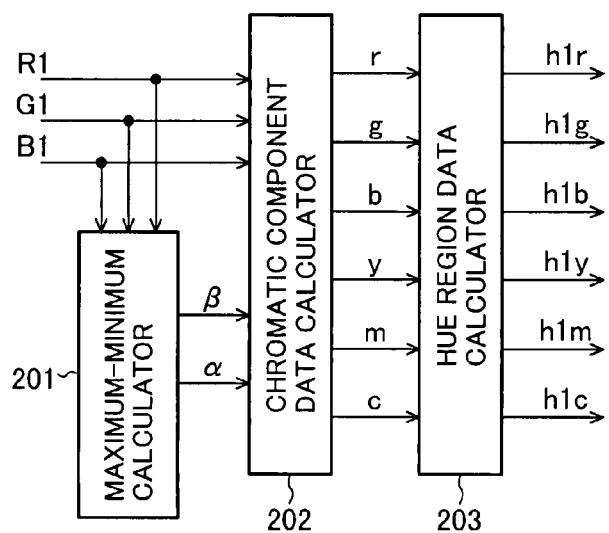
FIG. 2 is a block diagram showing an exemplary structure of the hue region data generating means in FIG. 1.
Figure 3A:
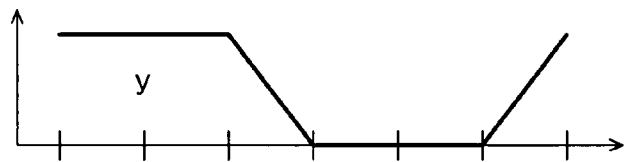
FIGS. 3(A) to 3(F) schematically show relationships between six hues and chromatic color component data.
Figure 3B:
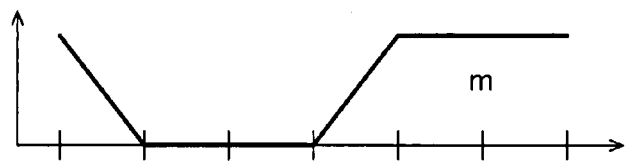
Figure 3C:
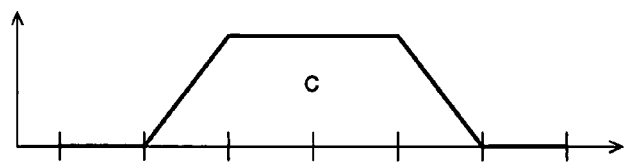
Figure 3D:
Figure 3E:
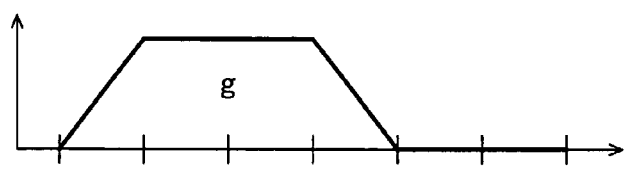
Figure 3F:
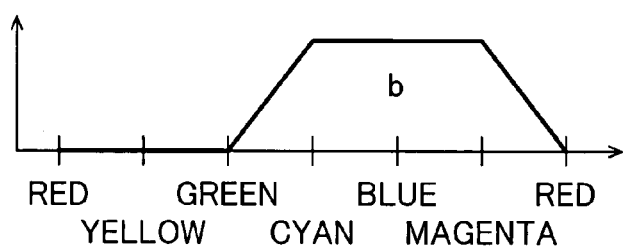

Referring to FIG. 2, the hue region data generator 200 comprises a maximum-minimum calculator 201, a chromatic component data calculator 202, and a hue region data calculator 203. The first image data R1, G1, B1 are input to the maximum-minimum calculator 201 and the chromatic component data calculator 202. For each pixel, the maximum-minimum calculator 201 selects the maximum value ($\beta$) and the minimum value ($\alpha$) of first image data R1, G1, B1 and outputs the selected maximum value ($\beta$) and minimum value ($\alpha$). The output maximum value ($\beta$) and minimum value ($\alpha$) are input to the chromatic component data calculator 202. The minimum value ($\alpha$) represents the achromatic (gray) component of the first image data R1, G1, B1.

The chromatic component data calculator 202 receives the first image data R1, G1, B1, and the maximum value $\beta$ and minimum value $\alpha$ output from the maximum-minimum calculator 201, and generates red chromatic color component data ($r$) by subtracting the minimum value $\alpha$ from the red first image data R1 ($r$=R1−$\alpha$), green chromatic color component data ($g$) by subtracting the minimum value $\alpha$ from the green first image data G1 ($g$=G1−$\alpha$), blue chromatic color component data ($b$) by subtracting the minimum value $\alpha$ from the blue first image data B1 (b=B1−α), yellow chromatic color component data (y) by subtracting the blue first image data B1 from the maximum value β (y=β−B1), magenta chromatic color component data (m) by subtracting the green first image data G1 from the maximum value β (m=β−G1), and cyan chromatic color component data (c) by subtracting the red first image data R1 from the maximum value β (c=β−R1). The chromatic color component data (r, g, b, y, m, and c) are obtained by removing achromatic components from the color data, and represent the hue and saturation of the color data. A property of the chromatic color component data (r, g, b, y, m, and c) obtained by the calculation described above is that at least one of the r, g, and b values is zero and at least one of the y, m, and c values is zero.

If, for example, the maximum value of the first image data is the red value R1 and the minimum value is the green value G1 (β=R1 and α=G1), then the values of the green and cyan chromatic component data (g and c) obtained by the subtraction described above are zero (g=0 and c=0); if the maximum value of the first image data is the red value R1 and the minimum value is the blue value B1 (β=R1 and α=B1), then the values of the blue and cyan chromatic component data are zero (b=0 and c=0).

Depending on the combination of maximum and minimum values of the first image data R1, G1, B1, more than two of the chromatic color component data values may be zero, always including at least one of the r, g, and b values and at least one of the y, m, and c values.

The chromatic color component data (r, g, b, y, m, and c) output from the chromatic component data calculator 202 are sent to the hue region data calculator 203.

The hue region data calculator 203 calculates hue region data by selecting a minimum value of each pair of adjacent hues among the chromatic color component data. More specifically, the hue region data calculator 203 calculates magenta hue region data h1m by selecting the smaller of the red and blue (r and b) chromatic color component values, calculates yellow hue region data h1y by selecting the smaller of the red and green (r and g) chromatic color component values, calculates cyan hue region data h1c by selecting the smaller of the green and blue (g and b) chromatic color component values, calculates green hue region data h1g by selecting the smaller of the yellow and cyan (y and c) chromatic color component values, calculates red hue region data h1r by selecting the smaller of the yellow and magenta (y and m) chromatic color component values, and calculates blue hue region data h1b by selecting the smaller of the magenta and cyan (m and c) chromatic color component values. The hue region data h1r, h1g, h1b, h1c, h1m, h1y are accordingly given by expressions (1A) to (1F) below, where min(A, B) indicates the smaller value of A and B.

$$h1r = \min(y, m) \tag{1A}$$

$$h1g = \min(y, c) \tag{1B}$$

$$h1b = \min(m, c) \tag{1C}$$

$$h1c = \min(g, b) \tag{1D}$$

$$h1m = \min(r, b) \tag{1E}$$

$$h1y = \min(r, g) \tag{1F}$$

A property of the hue region data h1r, h1g, h1b, h1c, h1m, h1y obtained from expressions (1A) to (1F) is that at least two of the hue region data values h1r, h1g, and h1b and at least two of the hue region data values h1y, h1m, and h1c are zero. If, for example, the values of the green and cyan chromatic component data are zero (g=0 and c=0) as in the first example described above, the values of the h1g, h1b, h1y, and h1c hue region data are also zero (h1g=h1b=0 and h1y=h1c=0).

Of the six pure hues (red, green, blue, cyan, magenta, yellow), hue region data h1r are valid only for red; hue region data h1g are valid only for green; hue region data h1b are valid only for blue; hue region data h1c are valid only for cyan; hue region data h1m are valid only for magenta; and hue region data h1y are valid only for yellow. More specifically, each of the hue region data can have a non-zero value for only one particular pure hue (red, green, blue, cyan, magenta, or yellow) and always has a value of zero for the other five pure hues.

In FIGS. 3(A) to 3(F), which schematically show relationships between the six hues and the chromatic color component data (y, m, c, r, g, and b), each of the chromatic color component data is valid for three pure hues. In FIGS. 4(A) to 4(F), which schematically show relationships between the six hues and the hue region data h1r, h1y, h1g, h1c, h1b, h1m, it is clear that each of the hue region data is valid for only one pure hue. The horizontal axes in FIGS. 3(A) to 3(F) and FIGS. 4(A) to 4(F) indicate hue, the vertical axes in FIGS. 3(A) to 3(F) indicate the maximum values of the chromatic color component data, and the vertical axes in FIGS. 4(A) to 4(F) indicate the maximum values of the hue region data.

Figure 4A:
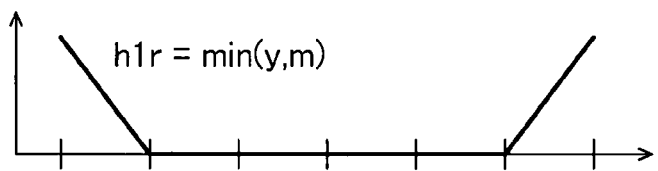
FIGS. 4(A) to 4(F) schematically show relationships between six hues and hue region data.
Figure 4B:
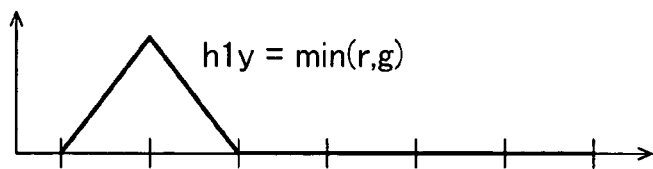
Figure 4C:
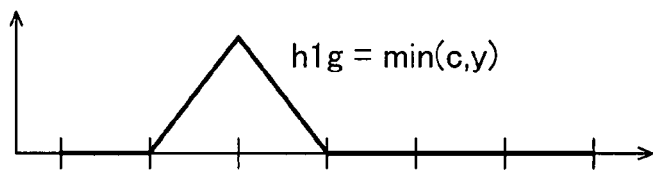
Figure 4D:
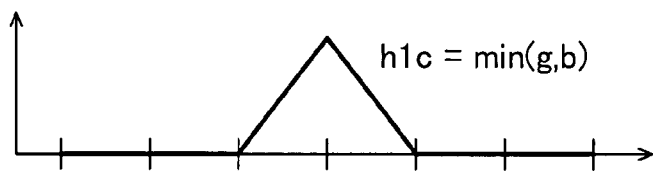
Figure 4E:
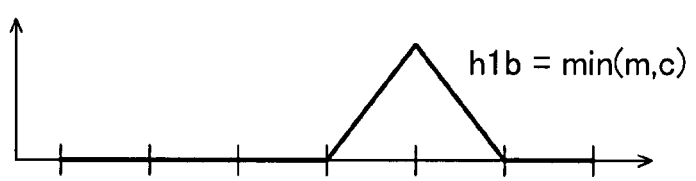
Figure 4F:
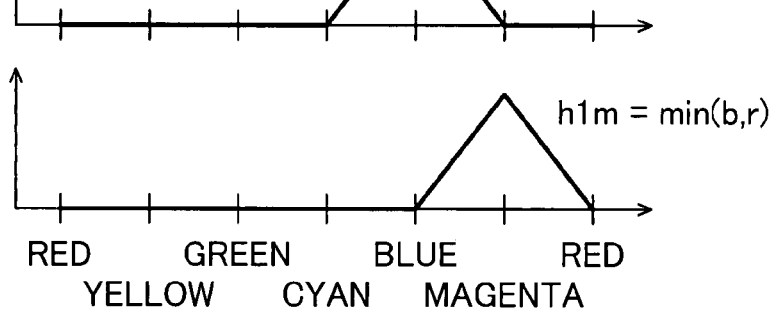

As shown in, for example, FIG. 4(B), the hue region data h1y are valid only in the yellow hue region between the pure red and green hues, taking a maximum value at the pure yellow hue, and decreasing toward the adjacent red and green hues. Similarly, as shown in FIG. 4(A) and FIGS. 4(C) to 4(F), each of the other hue region data is valid only in a region extending from the central value of one hue to the central values of the adjacent hues, has a maximum value at the center of this region, and decreases toward the edges of the region.

If W is the maximum possible value of the first color data R1, G1, and B1, then for a pure red color of maximum brightness (R1=W, G1=0, and B1=0), the value of the red chromatic color component data is W while the values of the green and blue chromatic color component data are zero (r=W, g=b=0), and the values of the yellow and magenta chromatic color component data are W while and the value of the cyan chromatic color component data is zero (y=m=W, c=0). The value of the red hue region data h1r is accordingly W (h1r=min(y, m)=W), and the values of the other hue region data h1g, h1b, h1y, h1m, h1c are all zero, because only the red hue region data h1r are valid for a pure red color. Similarly, for a pure green color, h1g=min(c, y) and the other hue region data are zero; for a pure blue color, h1b=min(m, c) and the other hue region data are zero; for a pure cyan color, h1c=min (g, b) and the other hue region data are zero; for a pure magenta color, h1m=min(b, r) and the other hue region data are zero; and for a pure yellow color, h1y=min(r, g) and the other hue region data are zero.

The hue region data h1r, h1g, h1b, h1c, h1m, h1y calculated in the hue region data calculator 203 are input to the combining coefficient calculator 300. The combining coefficient calculator 300 stores certain hue coefficients kr, kg, kb, kc, km, and ky, and calculates a data combining coefficient (k) by multiplying the hue coefficients by the corresponding hue region data, adding the products together, and dividing the total sum by the sum of the values of the hue region data. The data combining coefficient (k) is given by equation (2). The hue coefficients kr, kg, kb, kc, km, and ky may be externally set to appropriate values.

$$k = \frac{(kr \times h1r) + (kg \times h1g) + (kb \times h1b) + (kc \times h1c) + (km \times h1m) + (ky + h1y)}{h1r + h1g + h1b + h1c + h1m + h1y} \quad (2)$$

The hue coefficients kr, kg, kb, kc, km, and ky represent the ratios for combining the first image data and the processed third image data for red, green, blue, cyan, magenta, and yellow hues, respectively, and are set at values from zero to unity.

In equation (2), a property of the denominator on the right side is that the sum of the hue region data values h1$r$, h1$g$, h1$b$, h1$c$, h1$m$, h1$y$ is equal to the difference between the maximum value β and the minimum value α (β−α), so the data combining coefficient (k) is also given by equation (3) below. If the maximum value β and minimum value α of the first image data R1, G1, B1 calculated in the maximum-minimum calculator 201 are input to the combining coefficient calculator 300, the calculation for the data combining coefficient (k) can be somewhat reduced.

$$k = \frac{(kr \times h1r) + (kg + h1g) + (kb + h1b) + (kc \times h1c) + (km \times h1m) + (ky \times h1y)}{\beta - \alpha} \quad (3)$$

Although there are six product terms in the numerator on the right side in each of equations (2) and (3), since at least two of the hue region data values h1$r$, h1$g$, and h1$b$ and at least two of the hue region data values h1$y$, h1$c$, and h1$m$ are zero for each pixel as described above, in the actual calculation of the numerator, not more than two product terms are added together.

If, for example, the first image data R1, G1, B1 represent a pure yellow hue for each pixel, the data combining coefficient (k) is given by multiplying hue coefficient ky by hue region data h1$y$ and dividing the product by hue region data h1$y$, and is therefore equal to hue coefficient ky (k=ky×h1$y$/h1$y$=ky). The combining coefficient (k) in this case is determined solely by the yellow hue coefficient ky. Similarly, for pure red, green, blue, cyan, and magenta colors, the data combining coefficient (k) is determined solely by the red, green, blue, cyan, or magenta hue coefficient kr, kg, kb, kc, or km, respectively. If the first image data R1, G1, B1 represent a hue other than one of these six pure hues, the data combining coefficient (k) is obtained by adding the hue coefficients of a pair of adjacent pure hues in the ratio of the differences between the represented hue and the two adjacent pure hues.

Similarly, in the actual calculation of the denominator on the right side of equation (2), not more than two terms (of hue region data) need be added together.

The value of the data combining coefficient (k) calculated by equation (2) or (3) is from zero to unity. For the same hue, the same value of the data combining coefficient (k) is obtained from equation (2) or (3) regardless of the brightness and saturation of the color in the image data. The data combining coefficient (k) is input to the image data combiner 400.

The image data combiner 400 combines the first image data R1, G1, B1 and the third image data R3, G3, B3 according to the data combining coefficient (k) to generate the second image data R2, G2, B2. The second image data R2, G2, B2 are given by expressions (4A) to (4C) below.

$$R2 = \{(1-k) \times R1\} + \{k \times R3\} \quad (4A)$$

$$G2 = \{(1-k) \times G1\} + \{k \times G3\} \quad (4B)$$

$$B2 = \{(1-k) \times B1\} + \{k \times B3\} \quad (4C)$$

If the value of the data combining coefficient (k) is comparatively high, the proportion of the third image data in the second image data is increased, so the effect of the image processing by the image processing unit 100 on the second image data is increased; if the value of the data combining coefficient (k) is comparatively low, the proportion of the third image data in the second image data is reduced, so the effect of the image processing by the image processing unit 100 on the second image data is reduced. The data combining coefficient (k) representing the combining ratio of the first image data and the third image data varies according to the red, green, and blue values represented by the first image data R1, G1, B1 for each pixel.

The image processing unit 100 accordingly enables the size of the effect of image processing to be set on the basis of hue by setting the hue coefficients kr, kg, kb, kc, km and ky to appropriate values.

If, for example, the value of the hue coefficient kr is increased, the size of the image processing effect is increased for red hues.

Examples of the purposes of the image processing carried out in the image processing unit 100 include removing noise components included in the image data. The image data input to an image display apparatus are not always identical with the original image data generated in the camera or other apparatus that generated the image data, because the image data may have been affected by a variety of noise components in the data transmission process. In some cases, the image data generated in the image data generating apparatus already include noise components. If image data including noise are displayed without removing the noise components, the displayed image becomes difficult to watch. Image processing is therefore carried out to remove the noise components. The image processing carried out for the purpose of removing the noise components includes modifying the spatial or temporal frequency characteristics of the image data and reducing or removing the high frequency components of the image data.

Because conventional apparatus carries these processes out uniformly on the color data of all hues without making use of the hue information in the input image data, if the effect of noise components is noticeable in a particular hue, or a particular hue includes unpleasant noise components, the conventional apparatus does not remove only the noise components in the particular hue. If, for example, human skin color includes disagreeable noise components, the conventional noise removing means removes noise components in all hues in order to remove the noise components in the skin color. If this is done by removing high frequency components, it causes blurring of the image, even in hues that did not include any noticeable noise components.

Blue hues often appear in areas of blue sky, where comparatively few rapid spatial changes (such as fine patterns) normally occur. In areas with green hues, such as grass and leaves, however, there are usually many fine patterns (high frequency components). If, for example, in the original image, comparatively few changes occur in areas with blue hues (that is, only low frequency components are present), but numerous changes occur in areas with green hues (that is, high frequency components are present), high frequency noise components in the blue areas are highly noticeable. It is then preferable for the removal of high frequency noise components to be confined to areas with blue hues and for the high frequency components originally present in areas with green hues to be left intact.

Furthermore, human color vision is comparatively sensitive to changes in some colors and comparatively insensitive to changes in other colors. Image data are generally represented by data for three colors, for example, red, green, and blue. Noise components are accordingly also added to the data for three colors. A viewer perceives the image that is generated from the color data displayed in the image display apparatus as a mixture of color (light) stimuli. Even if the same amounts of noise are added to the color data of all hues, because of the characteristics of color vision, the viewer is comparatively sensitive to noise components in some hues, and comparatively insensitive to noise components in other hues. Accordingly, a process for removing noise components that is carried out uniformly on the color data of all hues is not necessarily satisfactory.

Furthermore, even if comparatively few noise components are present, image processing that intentionally blurs skin-colored parts of the image by removing an appropriate amount of high frequency components may be carried out, because reproduction of a smooth image in human skin areas is often preferred. This type of image processing also reduces gradation discontinuities in face areas in the image. It is preferable for this type of removal of high frequency noise components to be confined to skin-color areas, which are often reddish in hue. In areas with green hues, in which numerous high frequency components are often present as described above, it may be preferable to enhance high frequency components to reproduce a sharper and more well-defined image.

In the image processing apparatus in the first embodiment, the image processing unit 100 enables the size of the effect of the image processing to be set on the basis of hue by setting the hue coefficients kr, kg, kb, kc, km, ky to appropriate values. More specifically, the image processing apparatus in the first embodiment enables the size of the effect of image processing that is carried out on the first image data to be controlled on the basis of hue. If the effect of noise components is noticeable in a particular hue, or if a particular hue includes annoying noise components, the removal of noise components may be confined to that particular hue. The image processing apparatus in the first embodiment enables high frequency components in a particular hue to be reduced or to be enhanced according to the purpose of use and the user's preference.

Although image processing that modifies the spatial or temporal frequency characteristics of the image data has been described above as an example of the image processing carried out in the image processing unit 100, the image processing in the image processing unit 100 is not limited to this example. Other examples include changing the contrast of the image data and converting the gray scale. For example, the contrast of a particular hue can be enhanced by stretching the gray scale in a particular hue region. Alternatively, variations in gray levels can be reduced by reducing the contrast of the image data in a particular hue region to obtain a smoothing effect.

Second Embodiment

Figure 5:
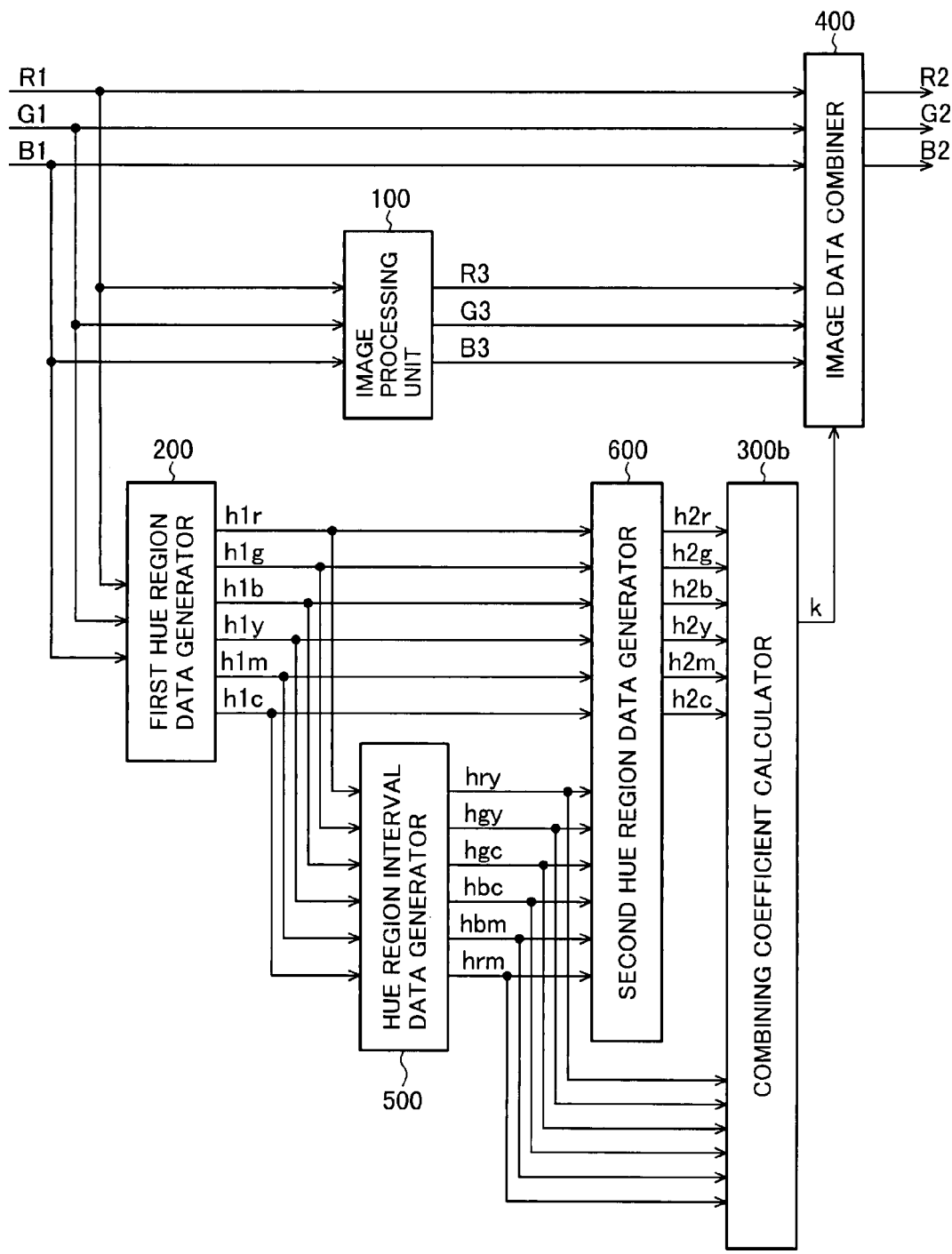
FIG. 5 is a block diagram illustrating an image display apparatus according to a second embodiment of the invention.

Referring to FIG. 5, the image processing apparatus in the second embodiment comprises an image processing unit 100, a hue region data generator 200, a combining coefficient calculator 300b, an image data combiner 400, a hue interval data generator 500, and a second hue region data generator 600. Since the second embodiment differs from the first embodiment by including the combining coefficient calculator 300b, the hue interval data generator 500, and the second hue region data generator 600, the structure and operation of the combining coefficient calculator 300b, the hue interval data generator 500, and the second hue region data generator 600 will be described below.

The hue region data generator 200 in the second embodiment generates first hue region data h1$r$, h1$y$, h1$g$, h1$c$, h1$b$, h1$m$ that are identical to the hue region data h1$r$, h1$y$, h1$g$, h1$c$, h1$b$, h1$m$ in the first embodiment; the second hue region data generator 600 generates the second hue region data h2$r$, h2$g$, h2$b$, h2$c$, h2$m$, h2$y$ from the first hue region data h1$r$, h1$y$, h1$g$, h1$c$, h1$b$, h1$m$.

The first hue region data h1$r$, h1$y$, h1$g$, h1$c$, h1$b$, h1$m$ are input to the hue interval data generator 500. The hue interval data generator 500 calculates hue interval data by selecting a minimum value from the first hue region data for each pair of adjacent hues. More specifically, the hue interval data generator 500 calculates hue interval data hry by selecting the smaller of the h1$r$ and h1$y$ first hue region data values, calculates hue interval data hgy by selecting the smaller of the h1$g$ and h1$y$ first hue region data values, calculates hue interval data hgc by selecting the smaller of the h1$g$ and h1$c$ first hue region data values, calculates hue interval data hbc by selecting the smaller of the h1$b$ and h1$c$ first hue region data values, calculates hue interval data hbm by selecting the smaller of the h1$b$ and h1$m$ first hue region data values, and calculates hue interval data hrm by selecting the smaller of the h1$r$ and h1$m$ first hue region data values. The hue interval data hry, hgy, hgc, hbc, hbm, hrm are accordingly given by expressions (5A) to (5F) below, where min(A, B) indicates the smaller value of A and B.

$$hry=\min(h1r,h1y) \quad (5A)$$

$$hgy=\min(h1g,h1y) \quad (5B)$$

$$hgc=\min(h1g,h1c) \quad (5C)$$

$$hbc=\min(h1b,h1c) \quad (5D)$$

$$hbm=\min(h1b,h1m) \quad (5E)$$

$$hrm=\min(h1r,h1m) \quad (5F)$$

A property of the hue interval data hry, hgy, hgc, hbc, hbm, hrm obtained from expressions (5A) to (5F) is that at least five of the hue interval data values hry, hgy, hgc, hbc, hbm, hrm are zero. If, for example, the green and cyan chromatic component data values are zero (g=c=0) and the hue region data values h1$g$, h1$b$, h1$y$, and h1$c$ are also zero (h1$g$=h1$b$=0 and h1$y$=h1$c$=0) as in the first example discussed in connection with expressions (1A) to (1F), the hue interval data values hry, hgy, hgc, hbc, and hbm are zero (hry=hgy=hgc=hbc=hbm=0).

Since the hue interval data hry, hgy, hgc, hbc, hbm, hrm are generated as describe above, hue interval data hry are valid only in the interval between red and yellow, hue interval data hgy are valid only in the interval between green and yellow, hue interval data hgc are valid only in the interval between green and cyan, hue interval data hbc are valid only in the interval between blue and cyan, hue interval data hbm are valid only in the interval between blue and magenta, and hue interval data hrm are valid only in the interval between red and magenta. More specifically, each of the hue interval data can have a non-zero value in only one interval between a mutually adjacent pair of two of the six pure hues (red, green, blue, cyan, magenta, yellow) and always has a value of zero in the five intervals between the other pairs of adjacent hues.

The relationships between the six hues and the hue interval data hry, hgy, hgc, hbc, hbm, hrm are shown schematically in FIGS. 6(A) to 6(F). The horizontal axis indicates hue, and the vertical axis indicates the maximum value of the hue interval data. Non-zero values of the hue interval data are confined to the six intervals intermediate between pairs of adjacent pure hues.

Figure 6:
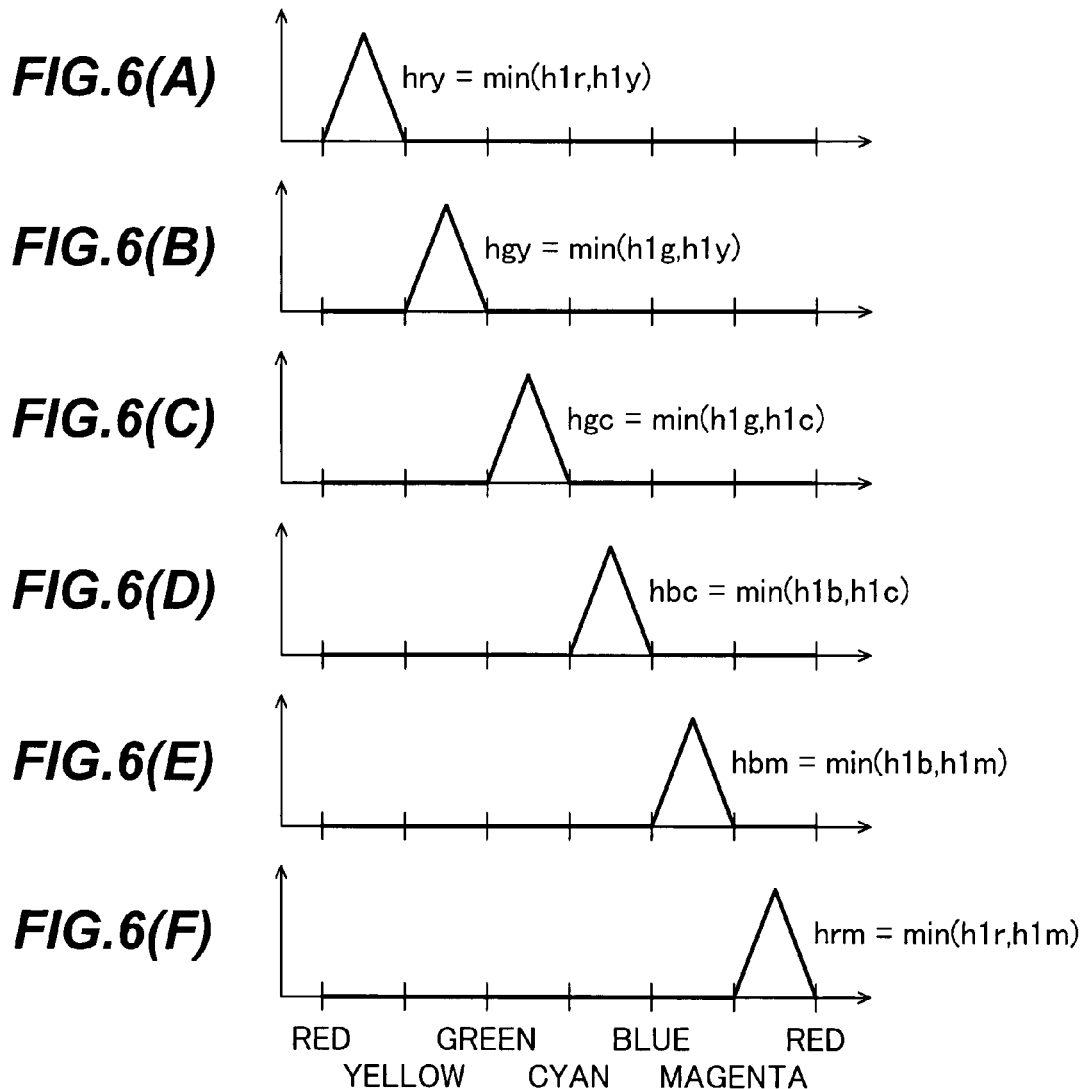
FIGS. 6(A) to 6(F) schematically show relationships between six hues and hue interval data.

In FIG. 6(A), for example, the hue interval data hry are valid only in the interval between pure red and pure yellow, taking a maximum value at the center of this interval, and decreasing toward the red and yellow ends of the interval. Similarly, as shown in FIGS. 6(B) to 6(F), the other hue interval data are valid only in respective intervals extending from one pure hue to the next pure hue, having a maximum value at the center of this interval (intermediate between the pair of adjacent hues), and decreasing toward the ends of the interval (at the pure hues). The maximum possible value of the hue interval data hry, hgy, hgc, hbc, hbm, hrm is one half of the maximum possible value of the first hue region data.

The hue interval data hry, hgy, hgc, hbc, hbm, hrm are input to the second hue region data generator 600 and the combining coefficient calculator 300b.

The second hue region data generator 600 accordingly receives both the first hue region data h1$r$, h1$y$, h1$g$, h1$c$, h1$b$, and h1$m$ and the hue interval data hry, hgy, hgc, hbc, hbm, hrm. The second hue region data generator 600 calculates the second hue region data h2$r$, h2$g$, h2$b$, h2$c$, h2$m$, h2$y$ by subtracting the hue interval data from the first hue region data. Since the non-zero region of each of the red, green, blue, cyan, magenta, and yellow first hue region data overlaps the non-zero regions of only two of the hue interval data, the second hue region data h2$r$, h2$g$, h2$b$, h2$c$, h2$m$, h2$y$ are given by expressions (6A) to (6F) below.

$$h2r = h1r - hry - hrm \quad (6A)$$

$$h2g = h1g - hgy - hgc \quad (6B)$$

$$h2b = h1b - hbc - hbm \quad (6C)$$

$$h2r = h1c - hgc - hbc \quad (6D)$$

$$h2m = h1m - hrm - hbm \quad (6E)$$

$$h2y = h1y - hry - hgy \quad (6F)$$

A property of the second hue region data h2$r$, h2$g$, h2$b$, h2$c$, h2$m$, h2$y$ obtained from expressions (6A) to (6F) is that at least five of the second hue region data values h2$r$, h2$g$, h2$b$, h2$c$, h2$m$, h2$y$ are zero. If, for example, the green and cyan chromatic component data values are zero (g=c=0), so that the first hue region data values h1$g$, h1$b$, h1$y$, and h1$c$ are zero (h1$g$=h1$b$=0 and h1$y$=h1$c$=0), and the hue interval data values hry, hgy, hgc, hbc, and hbm are also zero (hry=hgy=hgc=hbc=hbm=0), as described in the examples following expressions (1A) to (1F) and (5A) to (5F), then the second hue region data values h2$g$, h2$b$, h2$c$, and h2$y$ are also zero (h2$g$=h2$b$=h2$c$=h2$y$=0), and one of the second hue region data values h2$r$ and h2$m$ given by expressions (6A) and (6E) is also zero. Although the first hue region data values h1$r$ and h1$m$ are both non-zero in the interval between the pure red and magenta colors, in the range of hues from pure red to the center of this intermediate red-magenta region, h1$m$ is equal to the hue interval data value hrm, so the second hue region data value h2$m$ is zero; similarly, in the range of hues from pure magenta to the center of the intermediate red-magenta region, h1$r$ is equal to the hue interval data value hrm, so the second hue region data value h2$r$ is zero.

Of the six pure hues (red, green, blue, cyan, magenta, yellow), second hue region data h2$r$ are valid only for red; second hue region data h2$g$ are valid only for green; second hue region data h2$b$ are valid only for blue; second hue region data h2$c$ are valid only for cyan; second hue region data h2$m$ are valid only for magenta; and second hue region data h2$y$ are valid only for yellow. More specifically, each of the second hue region data can have a non-zero value for only one particular pure hue (red, green, blue, cyan, magenta, or yellow) and always has a value of zero at the other five pure hues.

FIGS. 7(A) to 7(F) schematically show the relationships between the six hues and the second hue region data h2$r$, h2$g$, h2$b$, h2$c$, h2$m$, h2$y$. The horizontal axis indicates hue and the vertical axis indicates the maximum value of the second hue region data. Each of the second hue region data is valid (can have a non-zero value) only in an area extending from one pure hue halfway to the two adjacent pure hues. The second hue region data are thus generally similar to the first hue region data h1$r$, h1$y$, h1$g$, h1$c$, h1$b$, h1$m$, but have more narrow regions of validity.

Figure 7:
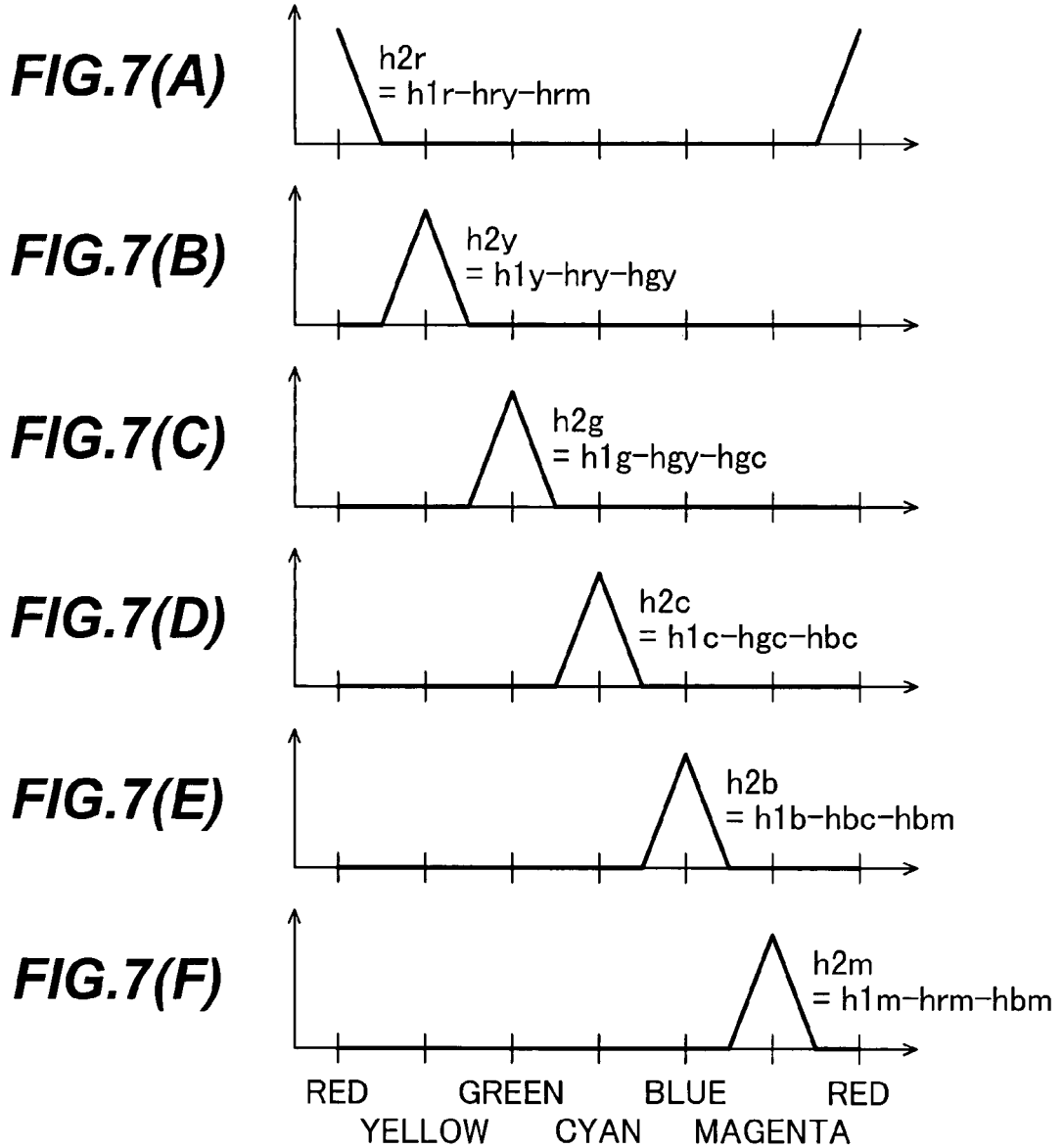
FIGS. 7(A) to 7(F) schematically show relationships between six hues and second hue region data.

As shown in, for example, FIG. 7(B), the second hue region data h2$y$ are valid only in the region extending from the center of the interval between the red and yellow hues to the center of the interval between the yellow and green hues, taking a maximum value at the pure yellow hue, and decreasing toward the center of the intermediate red-yellow interval and the center of the intermediate yellow-green interval. Similarly, as shown in FIG. 7(A) and FIGS. 7(C) to 7(F), each of the other second hue region data is valid only in a region extending from the center of one intermediate hue interval to the center of the next intermediate hue interval, has a maximum value midway between the centers of these intermediate intervals (at one of the six pure hues), and decreases toward the edges of the region (the centers of the intermediate hue intervals). The maximum possible value of the second hue region data is equal to the maximum possible value of the first hue region data.

The second hue region data h2$r$, h2$g$, h2$b$, h2$c$, h2$m$, h2$y$ calculated in the second hue region data generator 600 are input to the combining coefficient calculator 300b, together with the hue interval data hry, hgy, hgc, hbc, hbm, hrm. The combining coefficient calculator 300b stores corresponding hue coefficients kr, kg, kb, kc, km, ky, and hue interval coefficients kry, kgy, kgc, kbc, kbm, krm, and calculates a data combining coefficient (k) by multiplying the received data by the corresponding coefficients. More specifically, the combining coefficient calculator 300b calculates the data combining coefficient (k) from four quantities (k1, k2, hsum1, hsum2) according to the following formula.

$$k = \{k1 + (2 \times k2)\} / \{hsum1 + (2 \times hsum2)\} \quad (7A)$$

The quantities k1, k2, hsum1, and hsum2 in equation (7A) are given by equations (7B) to (7E) below.

$$k1 = (kr \times h2r) + (kg \times h2g) + (kb \times h2b) + (kc \times h2c) + (km \times h2m) + (ky \times h2y) \quad (7B)$$

$$k2 = (kry \times hry) + (kgy \times hgy) + (kgc \times hgc) + (kbc \times hbc) + (kbm \times hbm) + (krm \times hrm) \quad (7C)$$

$$hsum1 = h2r + h2g + h2b + h2c + h2m + h2y \quad (7D)$$

$$hsum2 = hry + hgy + hgc + hbc + hbm + hrm \quad (7E)$$

The hue coefficients kr, kg, kb, kc, km, and ky represent the ratios for combining the first image data and the processed third image data for red, green, blue, cyan, magenta, and yellow hues, respectively, and are set at values from zero to unity.

The hue interval coefficients kry, kgy, kgc, kbc, kbm, and krm represent the ratios for combining the first image data and the processed third image data for respective regions intermediate between respective pairs of adjacent hues among red, green, blue, cyan, magenta, and yellow, and are set at values from zero to unity.

In equation (7A) for obtaining the data combining coefficient (k), because the maximum possible value of the hue interval data (hry, hgy, hgc, hbc, hbm, hrm) from which the quantity k2 is obtained is one-half of the maximum possible value of the second hue region data (h2r, h2g, h2b, h2c, h2m, h2y) from which the quantity k1 is obtained, the quantity k2 is doubled before being added to the quantity k1; similarly, because the maximum possible value of the hue interval data (hry, hgy, hgc, hbc, hbm, hrm) from which the quantity hsum2 is obtained is one half of the maximum possible value of the second hue region data (h2r, h2g, h2b, h2c, h2m, h2y) from which the quantity hsum1 is obtained, the quantity hsum2 is doubled before being added to the quantity hsum1.

In equation (7A) for obtaining the data combining coefficient (k), a property of the denominator on the right side is that the sum of the quantity hsum1 and the doubled quantity hsum2 is equal to the difference between the maximum value $\beta$ and the minimum value $\alpha$ ($\beta-\alpha$), so the data combining coefficient (k) is also given by equation (8) below. If the maximum value $\beta$ and minimum value $\alpha$ of the first image data R1, G1, B1 are input to the combining coefficient calculator 300b, the calculation for the data combining coefficient (k) can be somewhat reduced.

$$k=\{k1+(2\times k2)\}/(\beta-\alpha) \tag{8}$$

The quantities k1 and k2 in equation (8) are given by equations (7B) and (7C), respectively.

Although in equation (7B), the quantity k1 is calculated as the sum of six product terms on the right side, since a property of the second hue region data is that at least five of the second hue region data values h2r, h2g, h2b, h2c, h2m, h2y are zero for each pixel as described above, the quantity k1 is either zero or, if non-zero, is equal to the value of one product term on the right side.

Although in equation (7C), the quantity k2 is calculated as the sum of six product terms on the right side, since a property of the hue interval data is that at least five of the hue interval data values hry, hgy, hgc, hbc, hbm and hrm are zero for each pixel as described above, the quantity k2 is either zero or, if non-zero, is equal to the value of one product on the right side.

Although in equation (7D), the quantity hsum1 is calculated as the sum of six terms on the right side, since a property of the second hue region data is that at least five of the second hue region data values h2r, h2g, h2b, h2c, h2m, h2y are zero for each pixel as described above, the quantity hsum1 is either zero or, if non-zero, is equal to the value of one term on the right side.

Similarly, although in equation (7E), the quantity hsum2 is calculated as the sum of six terms on the right side, since a property of the hue interval data is that at least five of the hue interval data values hry, hgy, hgc, hbc, hbm and hrm are zero for each pixel as described above, the quantity hsum2 is either zero or, if non-zero, is equal to the value of one term on the right side.

If, for example, the first image data R1, G1, B1 represent a pure yellow hue for each pixel, the quantities k1, k2, hsum1, and hsum2 are given by equations (7B) to (7E) below.

$$k1=ky\times h2y \tag{7B}$$

$$k2=0 \tag{7C}$$

$$hsum1=h2y \tag{7D}$$

$$hsum2=0 \tag{7E}$$

The data combining coefficient (k) is therefore given by equation (7A) below.

$$k=ky\times h2y/h2y=ky \tag{7A}$$

The data combining coefficient (k) in this case is determined solely by the yellow hue coefficient ky. Similarly, for pure red, green, blue, cyan, and magenta colors, the data combining coefficient (k) is determined solely by the red, green, blue, cyan, or magenta hue coefficient kr, kg, kb, kc, or km.

In the interval intermediate between red and yellow, only the second hue region data h2r or h2y and the hue interval data hry can have non-zero values; the other second hue region data and hue interval data have values of zero.

In the region extending from, for example, pure yellow to the center of the interval between red and yellow, since only the second hue region data h2y and hue interval data hry can have non-zero values, the data combining coefficient (k) is given by equation (7Aryy) below.

$$k=\{(ky\times h2y)+(2\times kry\times hry)\}/\{h2y+(2\times hry)\} \tag{7Aryy}$$

The value of the data combining coefficient (k) calculated by equation (7A) or (7Aryy) is from zero to unity. The data combining coefficient (k) is input to the image data combiner 400.

The image data combiner 400 combines the first image data R1, G1, B1 and the third image data R3, G3, B3 according to the data combining coefficient (k) to generate the second image data R2, G2, B2.

In the image processing apparatus in the second embodiment, the size of the effect of image processing by the image processing unit 100 can be set on the basis of hue and hue interval by setting the hue coefficients kr, kg, kb, kc, km and ky and hue interval coefficients kry, kgy, kgc, kbc, kbm, and krm to appropriate values. More specifically, the image processing apparatus in the first embodiment enables the size of the effect of image processing that is carried out on the first image data to be controlled on the basis of hue and hue interval.

The reason why the hue interval data are generated from the first hue region data and the second hue region data are generated from the hue interval data and the first hue region data in the second embodiment is to eliminate duplication of calculation and reduce the amount of the computation. In a variation of the second embodiment, the hue interval data generator and second hue region data generator generate the hue interval data and the second hue region data directly from the first image data. In this case, the hue interval data generator may include the hue region data generator 200 and hue interval data generator 500, for example, in FIG. 5, and the second hue region data generator may include the hue region data generator 200 and second hue region data generator 600.

Third Embodiment

Figure 8:
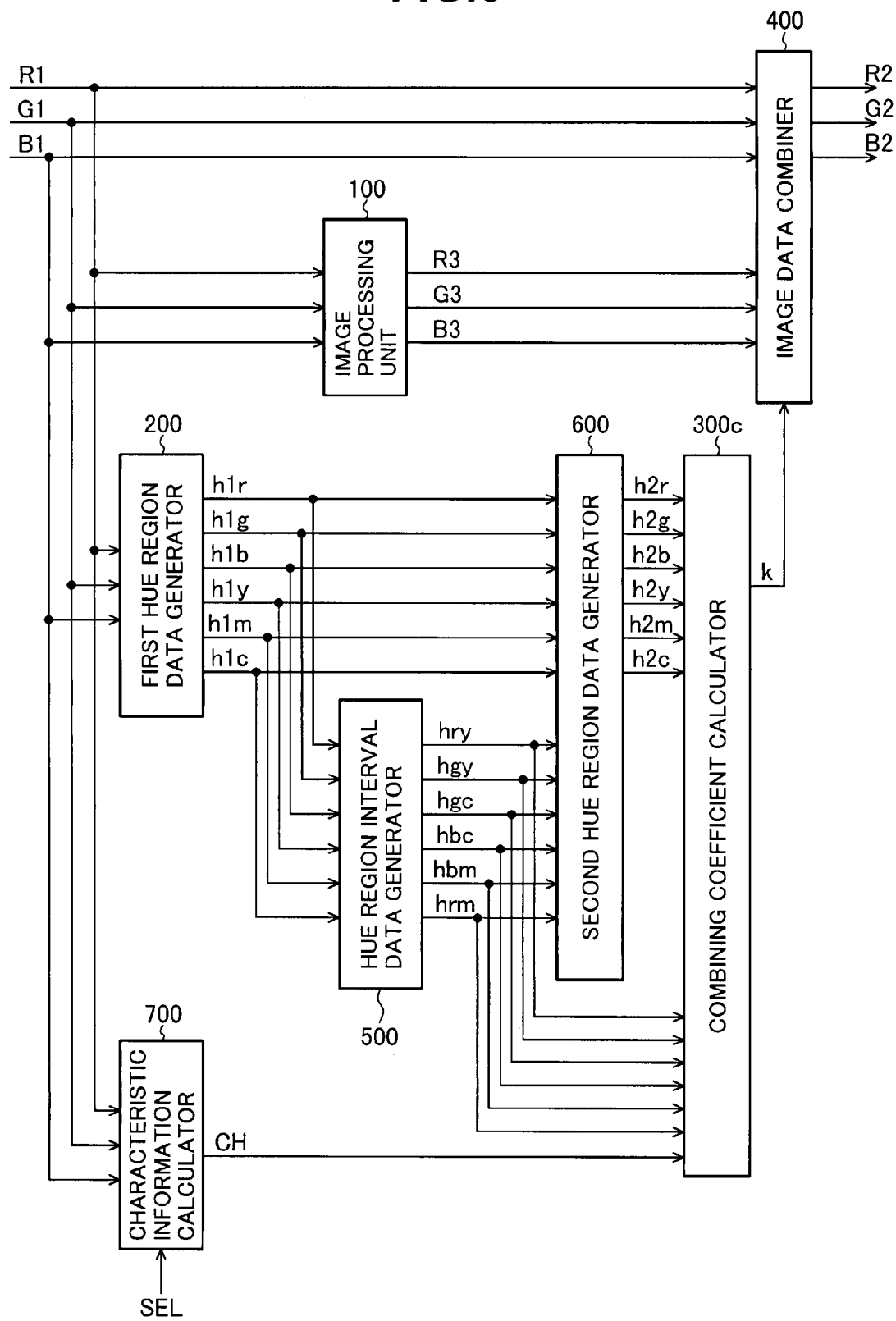
FIG. 8 is a block diagram illustrating an image display apparatus according to a third embodiment of the invention.

Referring to FIG. 8, the image processing apparatus in the third embodiment differs from the image processing apparatus in the second embodiment in FIG. 5 by including a characteristic information calculator 700, and by having a combining coefficient calculator 300c that calculates the data combining coefficient (k) by using characteristic information CH calculated in the characteristic information calculator 700 in addition to the second hue region data and the hue interval data.

The structure and operation of the characteristic information calculator 700 and the combining coefficient calculator 300c will be described below.

Figure 9:
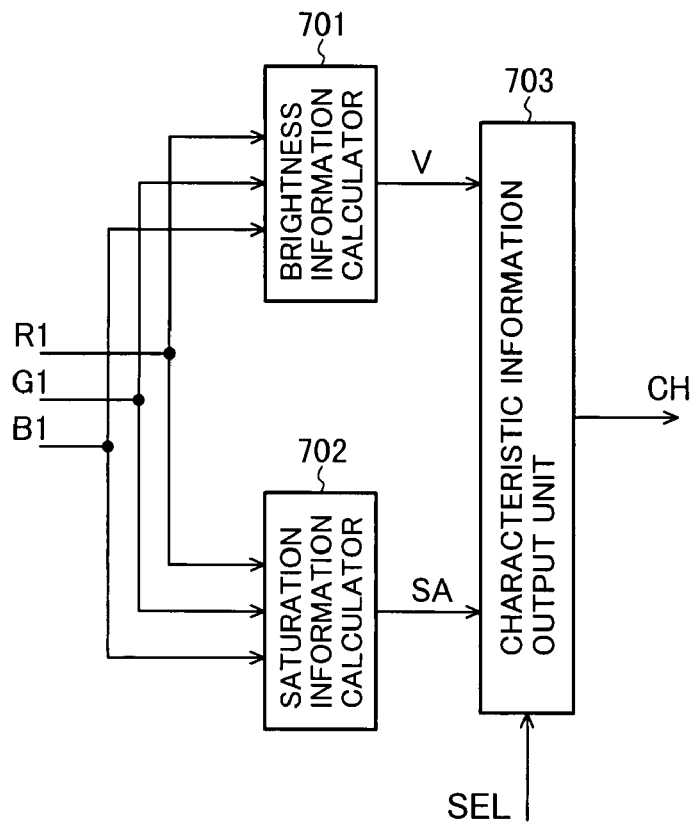
FIG. 9 is a block diagram showing an exemplary structure of a characteristic information calculator.

Referring to FIG. 9, the characteristic information calculator 700 comprises a brightness information calculator 701, a saturation information calculator 702, and a characteristic information output unit 703. The characteristic information calculator 700 receives the first image data R1, G1, B1 and a signal SEL for selecting characteristic information. The brightness information calculator 701 calculates brightness information V that represents the brightness of the first image data R1, G1, B1, and outputs the calculated brightness information V. The brightness information calculator 701 obtains, for example, the maximum value of the first image data R1, G1, B1 and outputs the obtained maximum value as brightness information V. The saturation information calculator 702 calculates saturation information SA that represents the saturation of the first image data R1, G1, B1, and outputs the calculated saturation information SA. The saturation information calculator 702 obtains, for example, the maximum value and minimum value of the first image data R1, G1, B1, calculates saturation information SA by subtracting the minimum value from the maximum value and dividing the difference by the maximum value, and outputs the quotient as the saturation information SA. Alternatively, the saturation information calculator 702 may simply calculate saturation information SA by subtracting the minimum value from the maximum value, and output the difference as the saturation information SA.

The characteristic information output unit 703 determines characteristic information CH from the brightness information V, the saturation information SA, and an externally provided selection signal SEL, and outputs the characteristic information CH to the combining coefficient calculator 300c. The characteristic information output unit 703 may be configured as, for example, a selector that the brightness information V, the saturation information SA, or both the brightness information V and saturation information SA according to the content of the selection signal SEL, and outputs the selected information as characteristic information CH.

The combining coefficient calculator 300c stores hue coefficients kr, kg, kb, kc, km, and ky, and hue interval coefficient kry, kgy, kgc, kbc, kbm, and krm, and calculates a basic data combining coefficient (kp) by the formula given for the data combining coefficient in the second embodiment:

$$kp=\{k1+(2 \times k2)\}/\{hsum1+(2 \times hsum2)\} \quad (9)$$

The quantities k1, k2, hsum1, and hsum2 in equation (9) are defined by equations (7B) to (7E) in the second embodiment.

The combining coefficient calculator 300c also calculates a correction coefficient (kq) from the characteristic information CH, and calculates the data combining coefficient (k) by multiplying the basic data combining coefficient (kp) by the correction coefficient (kq). The data combining coefficient (k) is therefore given by equation (10) below.

$$k=kp \times kq \quad (10)$$

The correction coefficient (kq) takes values from zero to unity. The image processing apparatus in the third embodiment enables the magnitude of the data combining coefficient (k) to be controlled according to one or both of the saturation information and brightness information obtained from the first image data. As a result, the image processing apparatus in the third embodiment enables the size of the effect of the image processing that is carried out on the first image data to be controlled on the basis of hue and hue interval, and also according to one or both of saturation and brightness.

Figure 10:
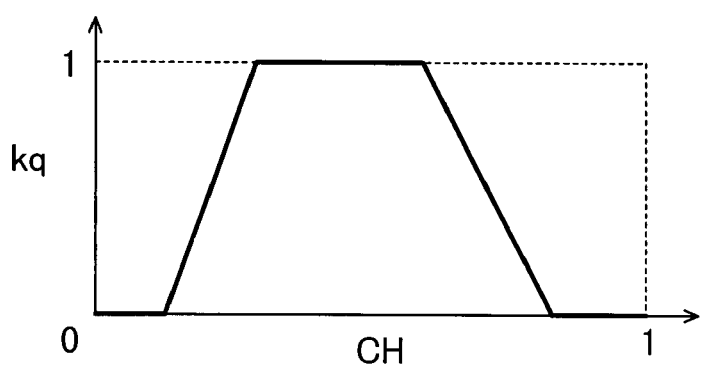
FIG. 10 shows an exemplary relation between characteristic information and the correction coefficient.

The correction coefficient (kq) may be obtained from the characteristic information CH by means of, for example, a lookup table that takes the characteristic information CH as an address and provides an appropriate correction coefficient value which has been stored in advance. FIG. 10 shows an exemplary relation between the characteristic information CH and the correction coefficient (kq). The horizontal axis indicates a normalized value of the characteristic information CH; the vertical axis indicates the value of the correction coefficient (kq). If the value of the normalized characteristic information CH is substantially midway between zero and unity (indicating an intermediate level of brightness or saturation), the correction coefficient (kq) is unity and the data combining coefficient (k) is unchanged. At the extremities of the normalized characteristic information scale (indicating a very high or very low level of brightness or saturation), the correction coefficient (kq) is zero, so the data combining coefficient (k) is zero and the image data combiner 400 ignores the output of the image processing unit 100.

As described above, the image processing apparatus in the third embodiment enables the size of the effect of image processing that is carried out on the first image data to be controlled on the basis of hue and hue interval, and on the basis of the brightness or saturation of colors in the image data. For example, fair human skin colors generally have low saturation values. In the third embodiment, it is possible to restrict the effect of a smoothing process to areas of, for example, hues of medium to low saturation in the red hue region or the interval between red and yellow, so that fair skin colors are smoothed, but blurring of the image in areas with comparatively highly saturated red and orange hues is avoided.

Those skilled in the art will recognize that further variations are possible within the scope of the invention, which is defined in the appended claims.

What is claimed is:

1. An image processing apparatus for processing first image data including first color data expressing values of picture elements for a plurality of colors to obtain second image data including second color data expressing values of the picture elements for the plurality of colors, the image processing apparatus comprising:
    an image processing unit for processing the first image data to obtain third image data;
    a hue region data calculator for using the first image data to calculate hue region data valid for particular hues among a plurality of hues;
    a data combining coefficient calculator for calculating a data combining coefficient from the hue region data, wherein said data combining coefficient represents a ratio for combining the first image data and the third image data; and
    an image data combiner for combining the first image data and the third image data according to the combining ratio to obtain the second image data.

2. The image processing apparatus of claim 1, further comprising a hue interval data generator for calculating hue interval data for a plurality of intervals between respective pairs of adjacent hues among the plurality of hues, wherein the data combining coefficient calculator also refers to the hue interval data in calculating the data combining coefficient.

3. The image processing apparatus of claim 1, wherein the plurality of hues include red, green, blue, yellow, cyan, and magenta.

4. The image processing apparatus of claim 1, further comprising a characteristic information calculator for obtaining characteristic information representing a magnitude of at least one of brightness and saturation in the first image data, wherein the data combining coefficient calculator also refers to the characteristic information in calculating the data combining coefficient.

5. The image processing apparatus of claim 1, wherein the image processing unit converts spatial or temporal frequency characteristics of the first image data to obtain the third image data.

6. The image processing apparatus of claim 1, wherein the image processing unit converts contrast of the first image data to obtain the third image data.

7. A method of processing first image data including first color data expressing values of picture elements for a plurality of colors to obtain second image data including second color data expressing values of the picture elements for the plurality of colors, the method comprising:
    processing the first image data to obtain third image data;
    using the first image data to calculate hue region data valid for particular hues among a plurality of hues;
    calculating a data combining coefficient from the hue region data, wherein said data combining coefficient represents a ratio for combining the first image data and the third image data; and
    combining the first image data and the third image data according to the combining ratio to obtain the second image data.

8. The image processing apparatus of claim 1, wherein the data combining coefficient representing the combining ratio of the first image data and the third image data varies according to values of the picture elements represented by the first image data.

9. The method of processing first image data according to claim 7, wherein the data combining coefficient representing the combining ratio of the first image data and the third image data varies according to values of the picture elements represented by the first image data.

10. An image processing apparatus for processing first image data including first color data expressing values of picture elements for a plurality of colors to obtain second image data including second color data expressing values of the picture elements for the plurality of colors, the image processing apparatus comprising:
    an image processing unit for converting spatial or temporal frequency characteristics of the first image data to obtain third image data;
    a hue region data calculator for using the first image data to calculate hue region data valid for particular hues among a plurality of hues;
    a data combining coefficient calculator for calculating a data combining coefficient from the hue region data; and
    an image data combiner for combining the first image data and the third image data according to the combining coefficient to obtain the second image data.

11. The image processing apparatus of claim 10, further comprising a hue interval data generator for calculating hue interval data for a plurality of intervals between respective pairs of adjacent hues among the plurality of hues, wherein the data combining coefficient calculator also refers to the hue interval data in calculating the data combining coefficient.

12. The image processing apparatus of claim 10, further comprising a characteristic information calculator for obtaining characteristic information representing a magnitude of at least one of brightness and saturation in the first image data, wherein the data combining coefficient calculator also refers to the characteristic information in calculating the data combining coefficient.

13. A method of processing first image data including first color data expressing values of picture elements for a plurality of colors to obtain second image data including second color data expressing values of the picture elements for the plurality of colors, the method comprising:
    converting spatial or temporal frequency characteristics of the first image data to obtain third image data;
    using the first image data to calculate hue region data valid for particular hues among a plurality of hues;
    calculating a data combining coefficient from the hue region data; and
    combining the first image data and the third image data according to the combining coefficient to obtain the second image data.

14. An image processing apparatus for processing first image data including first color data expressing values of picture elements for a plurality of colors to obtain second image data including second color data expressing values of the picture elements for the plurality of colors, the image processing apparatus comprising:
    an image processing unit for converting contrast of the first image data to obtain third image data;
    a hue region data calculator for using the first image data to calculate hue region data valid for particular hues among a plurality of hues;
    a data combining coefficient calculator for calculating a data combining coefficient from the hue region data; and
    an image data combiner for combining the first image data and the third image data according to the combining coefficient to obtain the second image data, wherein the image processing unit converts.

15. The image processing apparatus of claim 14, further comprising a hue interval data generator for calculating hue interval data for a plurality of intervals between respective pairs of adjacent hues among the plurality of hues, wherein the data combining coefficient calculator also refers to the hue interval data in calculating the data combining coefficient.

16. The image processing apparatus of claim 14, further comprising a characteristic information calculator for obtaining characteristic information representing a magnitude of at least one of brightness and saturation in the first image data, wherein the data combining coefficient calculator also refers to the characteristic information in calculating the data combining coefficient.

17. A method of processing first image data including first color data expressing values of picture elements for a plurality of colors to obtain second image data including second color data expressing values of the picture elements for the plurality of colors, the method comprising:
    converting contrast of the first image data to obtain third image data;
    using the first image data to calculate hue region data valid for particular hues among a plurality of hues;
    calculating a data combining coefficient from the hue region data; and
    combining the first image data and the third image data according to the combining coefficient to obtain the second image data.

* * * * *